United States Patent [11] 3,633,729

[72] Inventor James L. Reimers
San Jose, Calif.
[21] Appl. No. 1,660
[22] Filed Jan. 9, 1970
[45] Patented Jan. 11, 1972
[73] Assignee FMC Corporation
San Jose, Calif.

[54] CONTAINER-ORIENTING APPARATUS
2 Claims, 3 Drawing Figs.
[52] U.S. Cl................................................. 198/33 AB,
198/41
[51] Int. Cl..................................................B65g 17/46,
B65g 47/24
[50] Field of Search........................................ 198/33 AB,
41

[56] References Cited
UNITED STATES PATENTS
3,420,354  1/1969  Gardiner...................... 198/33 AB
1,179,383  4/1916  Adderson...................... 198/33 AB X
3,272,313  9/1966  Sarovich........................ 198/41

*Primary Examiner*—Edward A. Sroka
*Attorneys*—F. W. Anderson and C. E. Tripp

ABSTRACT: An orienting apparatus for orienting a spaced series of containers while moving along a path at high speed between a position wherein their axes extend transversely of the path to a position wherein their axes are in alignment. Singulated containers are received with their axes extended transversely of the path. Each container has one of its ends received on a dead plate and has its other end received on an endless turning conveyor having a high coefficient of friction and being driven at a higher speed than that of the incoming containers. A stationary magnet is disposed under the turning conveyor causing said other end of each container to be firmly gripped by said turning conveyor thereby turning the containers to a position wherein their axes are aligned. Guide means are provided to deflect the aligned containers transversely off the turning conveyor onto a take-away conveyor.

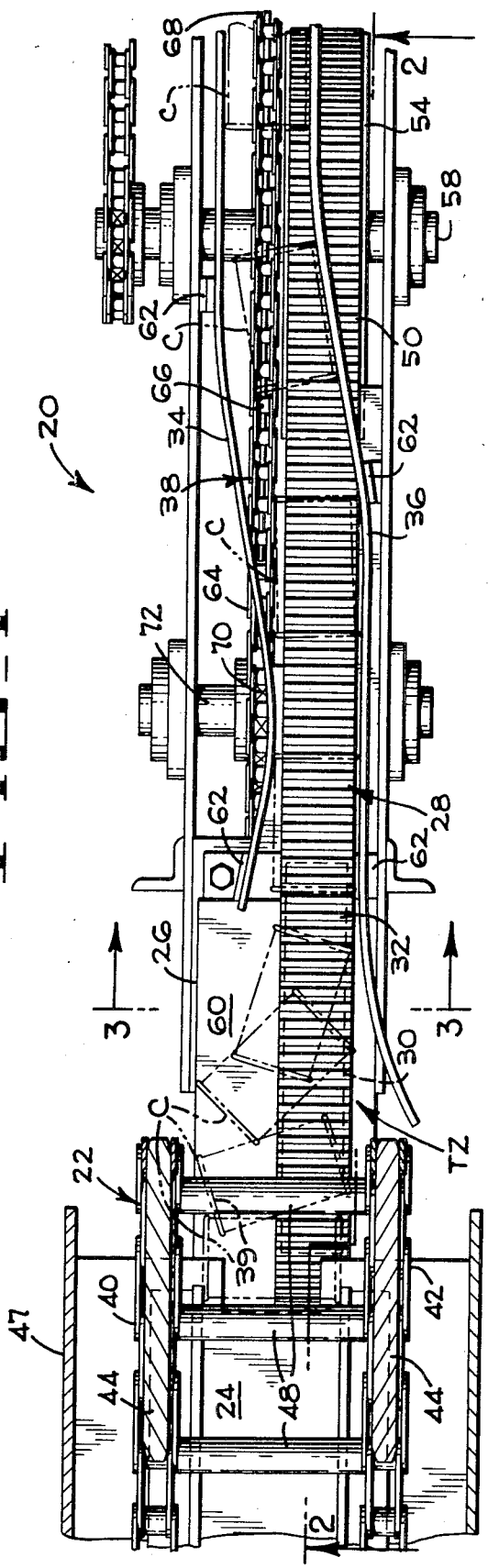
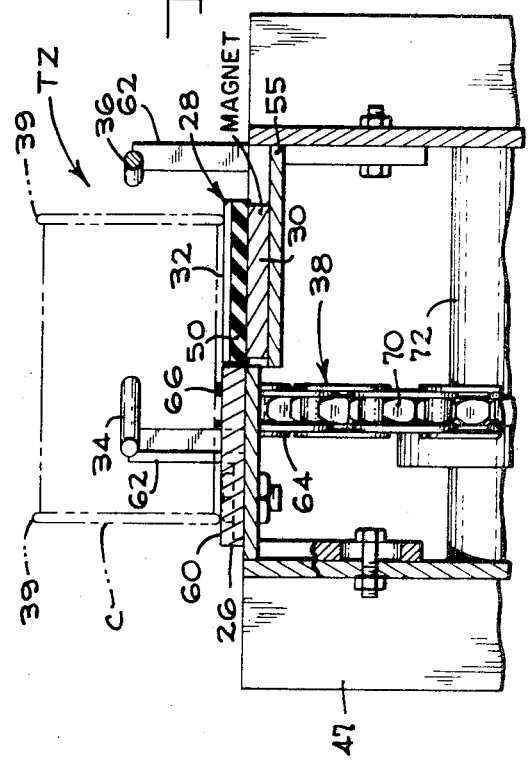

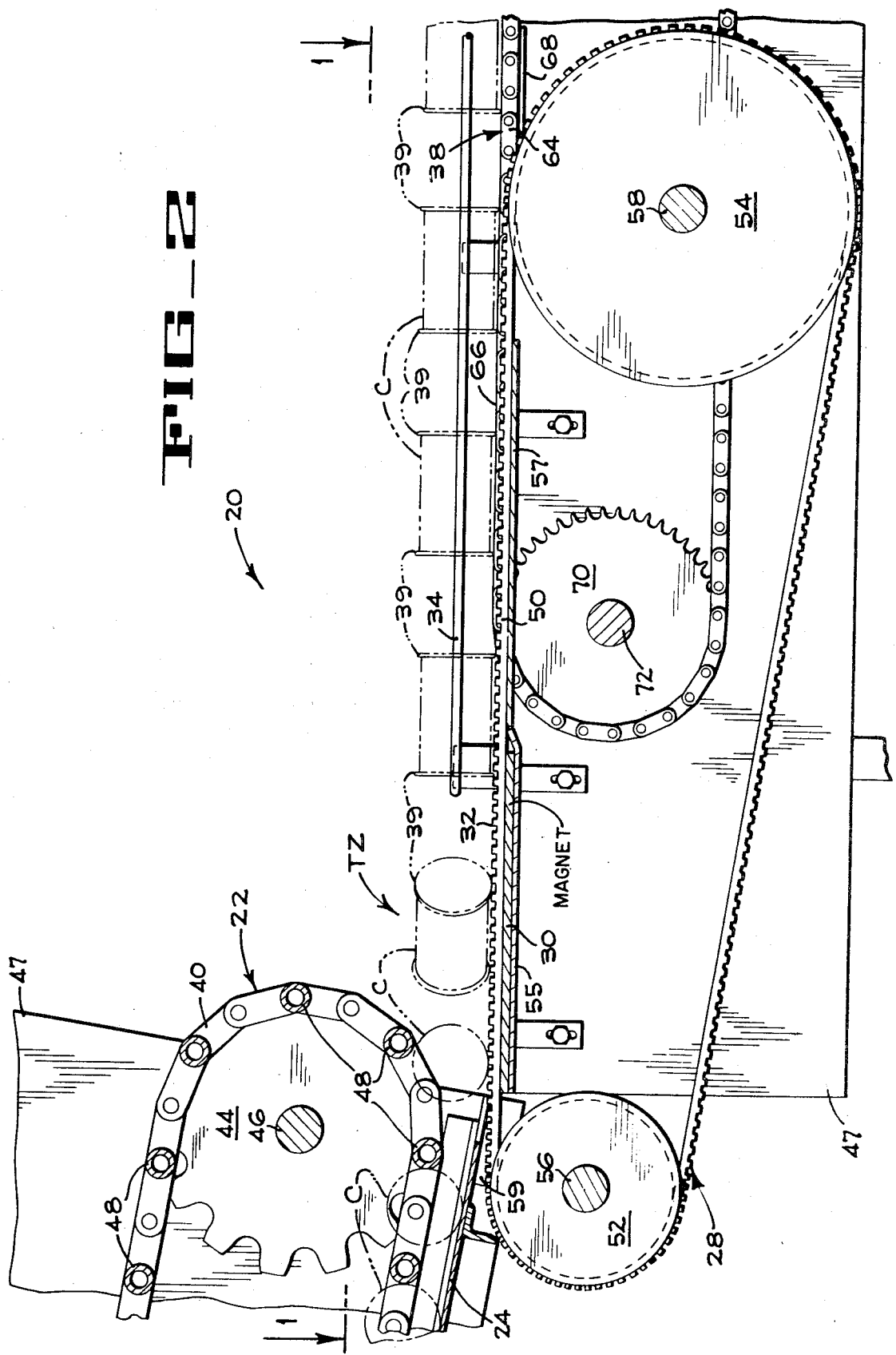

CONTAINER-ORIENTING APPARATUS

BACKGROUND OF THE INVENTION

1. Field of the Invention

This invention relates to an article-orienting apparatus and more particularly relates to a high-speed container-turning apparatus for shifting containers from a position wherein their axes are transverse of the path of movement of the containers to a position wherein their axes are aligned with the path of movement.

2. Description of the Prior Art

The present invention is an improvement over the container orienting apparatus disclosed in the U.S. Pat. No. 3,420,354 which patent issued to Gardiner on Jan. 7, 1969 and which is assigned to the assignee of the present invention. The Gardiner apparatus is substantially the same as that disclosed herein with the exception that the Gardiner apparatus relies primarily upon an upwardly inclined dead plate to cause the containers to turn 90°.

SUMMARY OF THE INVENTION

The container orienting apparatus of the present invention utilizes a flat dead plate maintained at the same level as the turning conveyor for supporting one end of each container while being turned, and relies on a stationary magnetic plate disposed under the turning conveyor to firmly grip the other end of each container to the conveyor for rapidly turning the containers.

BRIEF DESCRIPTION OF THE DRAWINGS

FIG. 1 is a schematic plan of the container-orienting apparatus of the present invention with a portion of the apparatus shown in section taken along lines 1—1 of FIG. 2.

FIG. 2 is a section taken along lines 2—2 of FIG. 1.

FIG. 3 is a section taken along lines 3—3 of FIG. 1 with a container illustrated in the position it assumes when first moved onto the dead plate and turning conveyor.

DESCRIPTION OF PREFERRED EMBODIMENT

In general, the high-speed container-orienting apparatus 20 (FIGS. 1 and 2) of the present invention includes a free-roller feed conveyor 22 which spaces and controls the movement of cylindrical containers C along an inclined chute 24 with the longitudinal axis of each container C extending transversely of the path of movement of the containers. One end of each container C rolls onto a dead plate 26 (FIGS. 1 and 3) while the other end of the container rolls onto the upper run of an endless turning conveyor 28 having a container-contacting surface provided with a high coefficient of friction, and having a bar magnet 30 disposed under its upper run 32 to firmly grip said other end of each container against the turning conveyor at a turning zone TZ. The turning conveyor 28 is driven at a high speed thereby causing the magnetically gripped end of each container C to be pulled forwardly relative to the other end of each container causing the container to partially slide and partially roll off the dead plate 26 onto the turning conveyor 28. Guide rails 34 and 36 then engage the containers and move them off the turning conveyor 28 onto a take-away conveyor 38.

The apparatus 20 is arranged to handle cylindrical ferromagnetic containers C, such as cans, which are supported by beads or chimes 39 formed on the ends thereof. It will be understood, however, that containers such as glass jars having a ferromagnetic cap on one end may also be handled by the apparatus 20.

More particularly, the free-roller feed conveyor 22 (FIGS. 1 and 2) comprises a pair of spaced endless chains 40 and 42 that are trained around pairs of sprockets 44 (only one pair being shown) keyed to shafts 46 (FIG. 2) that are journaled in the frame 47 of the apparatus. A plurality of rollers 48 extend between and are journaled on the chains 40 and 42 and are spaced sufficient distances apart to accommodate one container C between each adjacent pair of rollers. In accordance with the preferred embodiment of the invention, the feed conveyor 22 is continuously driven at about 150 feet per minute by drive means (not shown).

As indicated in FIGS. 1 and 2, the input end of the turning conveyor 28 is disposed immediately below the lower end of the chute 24. The turning conveyor includes an endless belt 50 that is trained around a pair of pulleys 52 and 54 keyed to shafts 56 and 58, respectively. The container-supporting surface of the belt 50 has a high coefficient of friction and has a corregated container contacting surface with grooves that are about one-eighth-inch deep and one-fourth-inch wide. As best shown in FIGS. 2 and 3, the upper run of the belt 50 of the turning conveyor is supported by the stationary bar magnet 30 at the turning zone TZ. The magnet 30 is supported by a nonmagnetic bracket 55 bolted to the frame 47. The bracket 55 also includes a conveyor-guiding portion 57 (FIG. 2) disposed downstream of the bar magnet 30. In accordance with the preferred embodiment of the invention the turning conveyor 28 is continuously driven at the rate of about 225 feet per minute.

The dead plate 26 is bolted to the frame 47 and includes a downwardly inclined lead-in portion 59 (FIG. 2) which forms an extension of the chute 24 and terminates in a flat portion 60 which begins at a point immediately forward of the plate at which the containers are released from the feed conveyor 22. The upper container-supporting surface of the dead plate 26, which is preferably stainless steel, lies in the same plane as that of the container-supporting surface of the turning conveyor 28 as illustrated in FIG. 3. After the containers C have been turned so that their longitudinal axes are parallel to the path of movement of the conveyor 28, the guide rails 34 and 36, which are secured to the frame 47 by brackets 62, deflect the containers transversely of their path of movement onto the take-away conveyor 38.

The take-away conveyor 38 comprises an endless chain 64 having its upper run 66 maintained at substantially the same elevation as the upper run of the turning conveyor 28 by a guide bar 68 secured to the frame 47. The chain 64 is trained around sprockets 70 (only one being shown) keyed to shafts 72 journaled in the frame 47 and is continuously driven at a rate of about 150 feet per minute by drive means (not shown).

In operation, the feed conveyor 22 moves the containers at the rate of about 150 feet per minute off the chute 24 for acceptance one at a time by the turning conveyor 28 and dead plate 26. As illustrated in FIG. 3, one end of each container C is supported by the dead plate 26 when in the turning zone TZ while the other end of the container is supported by the rough upper surface of the turning conveyor 28. The stationary bar magnet 30 then magnetically attracts the supported end of the container C thereby firmly holding that end against the rough surface of the turning conveyor 32. Since the turning conveyor is moving at a rate of about 75 feet per minute faster than the movement of the containers when discharged from the feed conveyor, the magnetically gripped end of the container is rapidly pulled forward causing the other end of the container to partially slide and partially roll off the dead plate 26 onto the turning conveyor 28.

The guide rails 34 and 36 (FIG. 1) then deflect the axially aligned containers C off the turning conveyor 28 and onto the take-away conveyor 38 in axial alignment with each other.

When the feed conveyor 22 and take-away conveyor 38 are moving at the rate of about 150 feet per minute, and when the turning conveyor 28 is moving at the rate of about 225 feet per minute, filled containers C which are 2-11/16 inches in diameter and 4 inches long have been successfully turned at the rate of about 450 containers per minute.

From the foregoing description it will be apparent that the container-orienting apparatus of the present invention is effective to turn ferromagnetic containers from a position wherein their longitudinal axes are normal to their path of movement to a position wherein their axes are in alignment while the containers are moving at high speeds. This turning is accomplished by supporting one end of the container on a flat dead plate and supporting its other end on the upper surface of the high-speed turning conveyor which upper surface and dead plate lie in a common plane. The stationary bar magnet is used for magnetically attracting said other end of the container in firm frictional engagement with the turning conveyor so that the conveyor can rapidly and reliably turn the container 90° without the aid of stationary abutments or the like.

Although the best mode contemplated for carrying out the present invention has been herein shown and described, it will be apparent that modification and variation may be made without departing from that what is regarded to be the subject matter of the invention.

What I claim is:

1. Apparatus for turning elongate ferromagnetic containers such as cans resting on their cylindrical surfaces, said apparatus being of the type comprising a continuous feed conveyor for delivering the containers with their long dimensions crosswise, a horizontal dead plate forming a continuation of said feed conveyor, a high-friction horizontal turning conveyor belt narrower than and forming a continuation of one side of said feed conveyor, said turning conveyor belt running next to said dead plate and at a speed greater than that of said feed conveyor for turning the containers lengthwise; the improvement wherein said dead plate is of a material less ferromagnetic than that of the containers and an elongate magnetic member under said turning conveyor and next to -ut not under said dead plate for causing the turning conveyor to turn the containers into end to end relation on said turning conveyor, the edge of said dead plate remote from the turning conveyor forming a continuation of said feed conveyor and being devoid of side flanges for a substantial distance along said turning conveyor to avoid damage to the containers.

2. The apparatus of claim 1, wherein said dead plate is formed of stainless steel.

* * * * *